Patented Mar. 2, 1937

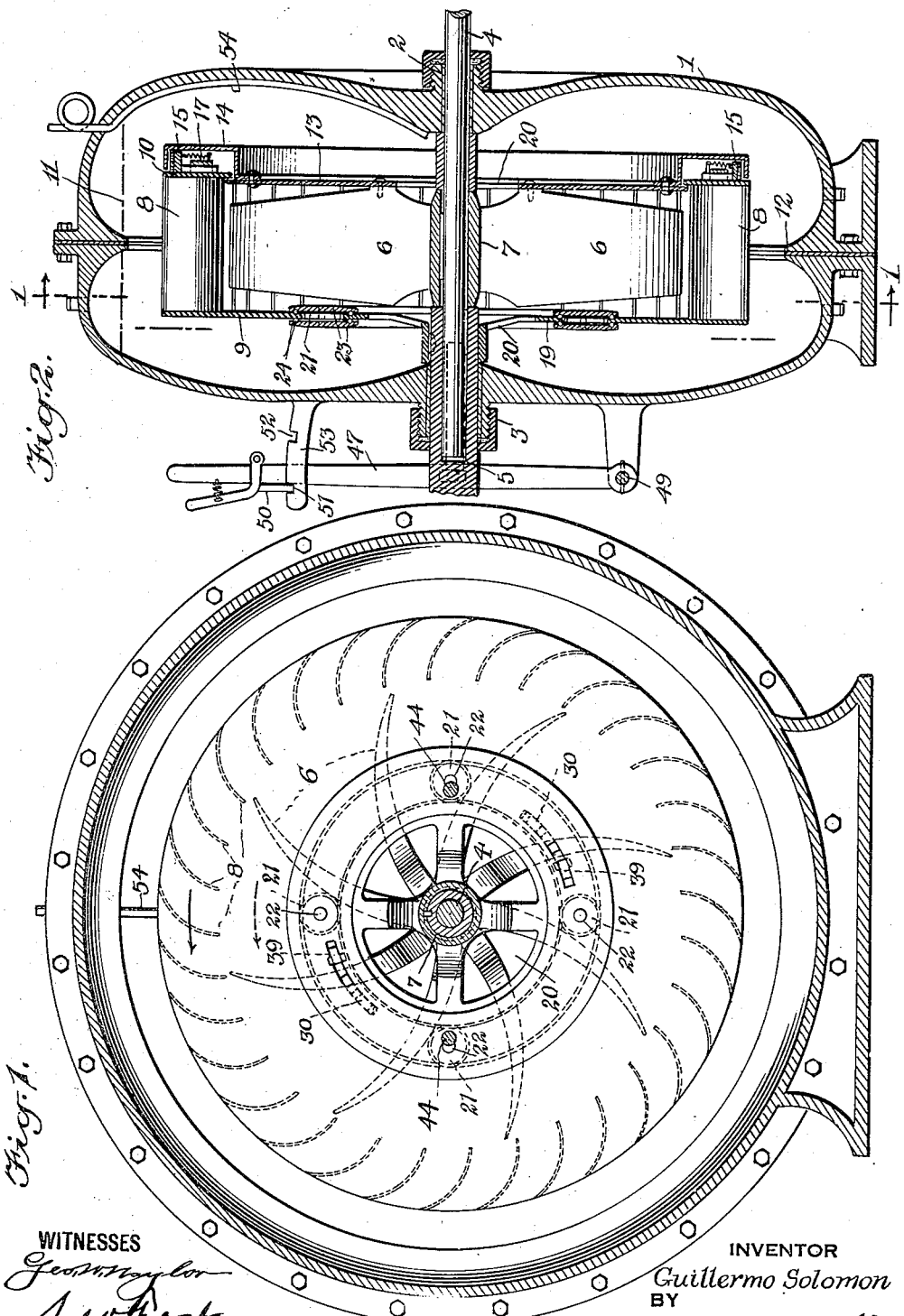

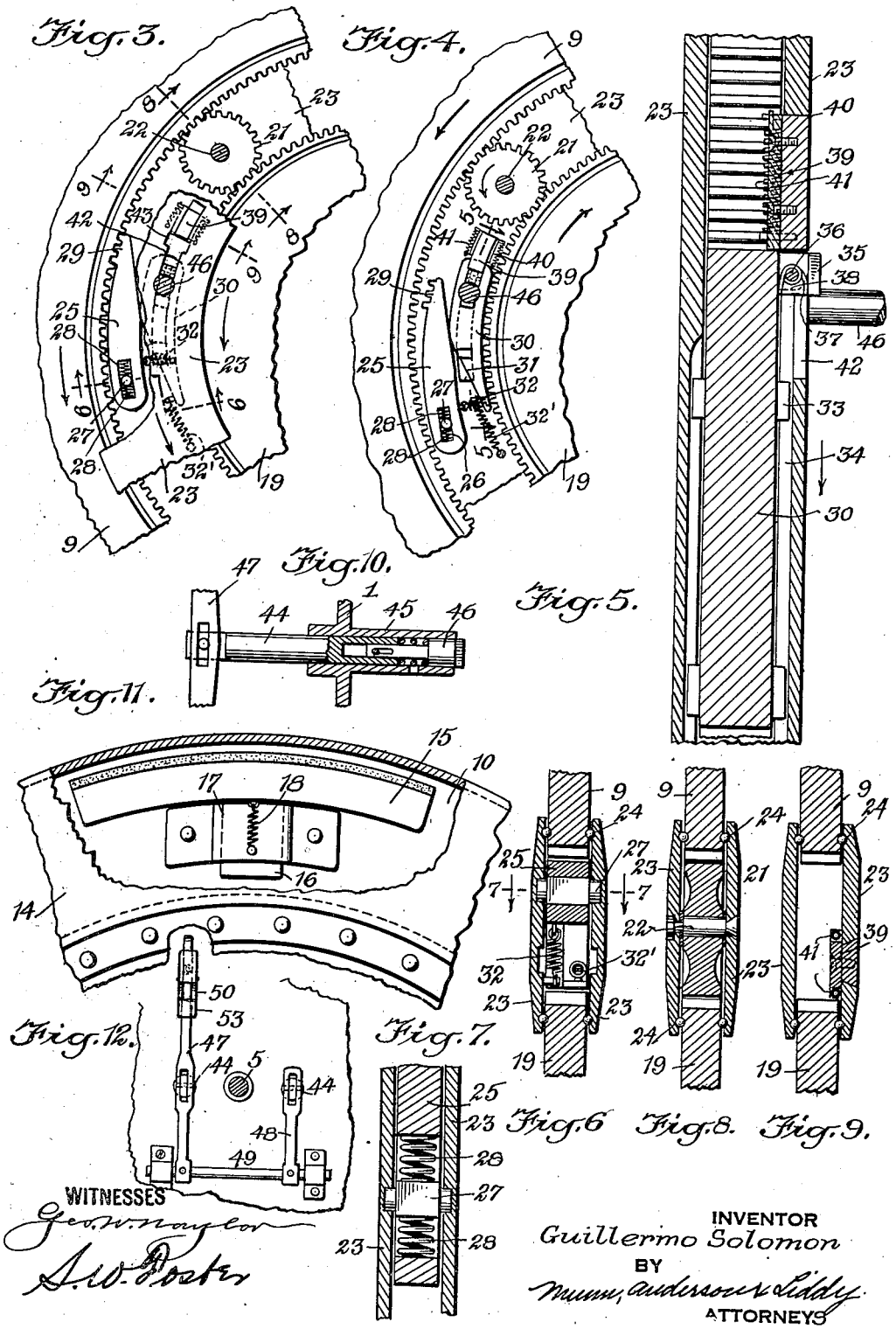

2,072,722

UNITED STATES PATENT OFFICE 2,072,722

HYDRAULIC TRANSMISSION

Guillermo Solomon, Santiago, Dominican Republic

Application June 17, 1936, Serial No. 85,719

7 Claims. (Cl. 74—293)

This invention relates to hydraulic transmissions, an object of the invention being to provide a transmission of this character which will insure a more or less flexible transmission of power from the drive shaft to the driven shaft and which includes novel means whereby the direction of movement of the driven shaft may be reversed.

With these and other objects in view, the invention consists in certain novel features of construction and combinations and arrangements of parts, all of which will be more fully hereinafter described and pointed out in the claims.

In the accompanying drawings—

Figure 1 is a view in vertical section through the stator or casing of the transmission, the view being taken on the line 1—1 of Fig. 2;

Fig. 2 is a view in vertical section through the center of Fig. 1 and at right angles thereto;

Fig. 3 is an enlarged fragmentary view mainly in elevation but partly broken away illustrating one of my improved gear-locking assemblies showing the same in position to lock the gears so as to compel them to turn together;

Fig. 4 is a view similar to Fig. 3 showing the parts in position to release the gears which is the reversing position;

Fig. 5 is an exaggerated detail view in section on the line 5—5 of Fig. 4;

Fig. 6 is an exaggerated detail view in section on the line 6—6 of Fig. 3;

Fig. 7 is a fragmentary view in section on the line 7—7 of Fig. 6;

Fig. 8 is a view similar to Fig. 7 but taken on the line 8—8 of Fig. 3;

Fig. 9 is a view similar to Figs. 7 and 8 but taken on the line 9—9 of Fig. 3;

Fig. 10 is a fragmentary detail view illustrating one of the plungers;

Fig. 11 is a fragmentary view partly in elevation and partly in section illustrating one of the brake shoes and its adjacent parts; and Fig. 12 is a fragmentary view in elevation illustrating the plunger operating levers.

1 represents a casing or stator which is provided centrally with aligned bearings 2 and 3 for the reception of a drive shaft 4 and a driven shaft 5 respectively. These shafts are in alignment and one shaft preferably telescopes into the other as shown clearly in Fig. 2 of the drawings. On the drive shaft 4 and centrally within the stator 1 a rotary impeller 6 is secured. The hub 7 of this impeller is preferably keyed to the drive shaft, and said impeller comprises a circular series of curved blades or vanes as clearly shown in Fig. 1 of the drawings. A circular rotor 8 is located around the rotary impeller 6 and comprises a circular series of curved blades or vanes secured at one end to an internal gear wheel 9 and at the other side of the impeller the blades or vanes are secured to a ring 10. The stator 1 is filled with a proper fluid, such as oil, up to approximately a level as indicated by the dot-and-dash line 11 in Fig. 2, and this stator 1 is provided with an annular internal web 12 which deflects the fluid to both sides of the stator after passing through the rotor, and it is to be understood that the impeller 6 forces the liquid radially outward thereof into contact with the blades of the rotor causing the latter to turn.

A disk 13 is secured to one side of the impeller 6 and carries at its outer edge an annular brake drum 14 which is of general channel shape in cross section, and in this drum 14 any desired number of brake shoes 15 are located. These brake shoes have bars 16 secured to the back and center thereof and mounted to slide in brackets 17 on the disk 10, and coil springs 18 connect the shoes and the brackets holding the shoes normally away from the internal surface of the brake drum but when the speed becomes sufficiently great the shoes 15 will be moved outwardly by centrifugal force to engage the brake drum and check the speed of the rotor.

On the driven shaft 5 and within the internal gear 9 an external gear 19 is fixedly secured. This external gear 19 and the disk 13 above referred to are provided centrally with openings 20 to admit fluid to the center of the impeller so that this fluid which is thrown outwardly by the impeller passes around the rotor and enters again at the center of the impeller in a continuous operating circuit. The internal gear 9 and the external gear 19 are operatively connected by a circular series of pinions 21 meshing with both of said gears, and these pinions 21 are mounted on pins 22 which also function to connect a pair of rings 23 which are located at opposite sides of the gears and enclose and cover the teeth of said gears with the pinions 21 housed between them. These rings 23 are spaced from the gears by ball bearings 24, which of course reduce friction to a minimum. These rings 23 also support gear-locking assemblages one of said assemblages being illustrated in detail in Figs. 3 and 4 of the drawings and indicated more or less diagrammatically in Fig. 1 of the drawings. I preferably provide at least two of these assemblages at diametrically opposite positions on the rings. However, these assemblages are precisely alike in construction and operation and the description hereinafter of one of these assemblages will apply alike to both.

Each of the gear-locking assemblages includes a locking dog 25 having a longitudinal slot 26 at one end receiving a pivot pin 27 and coil springs 28 are located in the slot 26 at opposite sides of the pivot pin to permit a certain longitudinal movement of the dog on its pivot to insure a proper registering of teeth 29 at the free end of the dog with the teeth of the internal gear 9. Back of the dog 25 a sliding cam block 30 is provided and this cam block 30 at one end has a cam face 31 which engages the dog 25 and when the block is in the position shown in Fig. 3 of the drawings the block functions to force the dog into locking engagement with the internal gear. A coil spring 32 is connected to the dog 25 and tends to draw the dog away from engagement with the internal gear 9. A second coil spring 32' is connected to the cam block 30 and holds the same normally in the position shown in Fig. 3 and is put under tension when the block is moved to the position shown in Fig. 4 of the drawings and when permitted returns the block to the position shown in Fig. 3. The block 30 is provided at opposite sides with keys 33 which ride in grooves 34 in the inner faces of the rings 23 and on the block 30 adjacent one end a block-like finger 35 is pivotally mounted on a pin 36 and a spring 37 positioned around the pivot to hold the finger 35 in its normal position. One side of the finger 35 is cut away or rounded as shown at 38 which permits the finger to pivot in one direction but the other surfaces of the finger are angular so that the finger cannot pivot in the reverse direction. A cushioning block 39 is mounted to slide in a slot 40 in one of the rings 23 and is held in its forward position by a pair of coil springs 41. The finger 35 projects through a slot 42 in one of the rings 23 and this slot 42 is enlarged adjacent one end as shown at 43. A pair of plungers 44 project through guide sleeves 45 in the casing wall and are adapted when moved inwardly to lie in the path of movement of the finger 35, and these plungers have spring-pressed extensions 46 at their inner ends which when said extensions register with the enlarged portion 43 of the slot 42, spring into said enlarged portion of the slot and remain therein until the plungers are withdrawn. The outer ends of the plungers are operatively connected to crank arms 47 and 48 respectively and these crank arms are secured to a shaft 49. One of the arms, 47, constitutes a hand lever which is provided with a spring-pressed detent 50 adapted to engage in either of two notches 51 and 52 in a fixed segment 53. To relieve any pressure within the casing or stator, I preferably provide the same with a breather tube 54 which extends to a point adjacent the center of the stator and also outside of the stator as clearly shown in Fig. 2 of the drawings.

The operation is as follows: When the transmission is operating as a forward drive the gear-locking assemblies are in the position shown in Fig. 3 of the drawings; that is to say, the dogs 25 engage the teeth of the internal gear 9 and compel the internal gear 9 and the external gear 19 to turn together in the same direction, which is a counterclockwise direction as indicated in Fig. 3 of the drawings. When it is desired to reverse the transmission, that is, to drive the external gear 19 and the driven shaft 5 in the opposite direction, the operator manipulates the lever 47 causing the plungers 44 to be moved inwardly and held in this position by the detent 50 engaging in the notch 52 of segment 53. When the plungers are moved to this inward position their inner ends will lie in the path of movement of the fingers 35 and as these fingers engage the plungers, as shown in Figs. 3, 4 and 5 of the drawings, the cam blocks 30 will be drawn rearwardly, that is, in a direction away from the dogs 25, allowing the springs 32 to pull the dogs away from their engagement with the teeth of the internal rack 9. At the same time, the plungers at their inner ends will project into the slots 43 and hold the rings 23 against movement. Thus when the internal gear 9 is revolved in the direction of the arrow shown in Fig. 4, it will cause the pinions 21 to turn and drive the external gear 19 in the direction of the arrow shown in Fig. 4, thus reversing the drive of the driven shaft. When the plungers are drawn outwardly the springs 32' will throw the cam blocks 30 back to the position shown in Fig. 3, forcing the dogs 42 into engagement with the internal gear 9 and the gears 9 and 19 will then turn together in the same direction.

While I have illustrated and described what I believe to be a preferred embodiment of my invention, it is obvious that various changes might be made in the general form and arrangement of parts without departing from my invention, and hence I do not limit myself to the precise details set forth but consider myself at liberty to make such changes and alterations as fairly fall within the spirit and scope of the appended claims.

I claim:

1. A hydraulic transmission including a stator, drive and driven shafts projecting into the stator, a rotary impeller on the drive shaft, an external gear wheel on the driven shaft, a rotor around the impeller, an internal gear wheel on the rotor, pinions connecting the internal and external gear wheels, a disk secured to the impeller, a brake drum on the disk, and centrifugally operated brake shoes on the rotor adapted to engage the brake drum, said disk and external gear wheel having central openings to admit fluid to the center of the impeller and said stator having a central internal web which deflects the fluid thrown inwardly by the impeller after passage through the rotor.

2. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, means carried by the rings and adapted to lock the rings to the internal gear wheel, and manually operated means for releasing said locking means.

3. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, and gear-locking assemblages carried by the rings and including pivoted dogs with means for holding said dogs in engagement with the internal gear to lock the gears together.

4. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, gear-locking assemblages carried by the rings and including pivoted dogs with means for holding said dogs in engagement with the internal gear to lock the gears together, said means including movable cam blocks engaging the dogs, and means projecting into the stator and adapted to be manually operated to engage the blocks and move them to a position to permit the dogs to be released from engagement with the internal gear.

5. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, gear-locking assemblages carried by the rings and including pivoted dogs with means for holding said dogs in engagement with the internal gear to lock the gears together, said means including movable cam blocks engaging the dogs, means projecting into the stator and adapted to be manually operated to engage the blocks and move them to a position to permit the dogs to be released from engagement with the internal gear, and springs connected to the dogs and to the blocks and adapted to move said parts in one direction.

6. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, gear-locking assemblages carried by the rings and including pivoted dogs with means for holding said dogs in engagement with the internal gear to lock the gears together, said means including movable cam blocks engaging the dogs, means projecting into the stator and adapted to be manually operated to engage the blocks and move them to a position to permit the dogs to be released from engagement with the internal gear, said last-mentioned means including plungers projected through the wall of the stator, means operatively connecting the plungers outside of the stator to permit manual manipulation thereof, and means to hold the plungers in either of their normal positions, and one of said rings having a pin therein to receive the ends of the plungers when the blocks are moved to their withdrawn position.

7. A hydraulic transmission including a stator, drive and driven shafts projecting into the stator, a rotary impeller on the drive shaft, a gear wheel on the driven shaft, a rotor around the impeller, an internal gear wheel on the rotor, a pair of rings having anti-friction engagement with opposite sides of both gear wheels, pinions mounted to turn between the rings and operatively connecting the gear wheels, gear-locking assemblages carried by the rings and including pivoted dogs with means for holding said dogs in engagement with the internal gear to lock the gears together, said means including movable cam blocks engaging the dogs, means projecting into the stator and adapted to be manually operated to engage the blocks and move them to a position to permit the dogs to be released from engagement with the internal gear, sail last-mentioned means including plungers projecting through the wall of the stator, means operatively connecting the plungers outside of the stator to permit manual manipulation thereof, means to hold the plungers in either of their normal positions, one of said rings having an opening therein to receive the ends of the plungers when the blocks are moved to their withdrawn position, and a spring cushion block slidably mounted in one of said rings and adapted to be engaged by said blocks when moved to one extreme position.

GUILLERMO SOLOMON.